US011343789B2

(12) United States Patent
Sharma et al.

(10) Patent No.: US 11,343,789 B2
(45) Date of Patent: May 24, 2022

(54) ARRANGEMENT FOR RESPONDING TO A FAILURE IN THE COMMUNICATION OF THE POSITION ASSISTANCE INFORMATION

(71) Applicant: Sony Corporation, Tokyo (JP)

(72) Inventors: Vivek Sharma, Basingstoke (GB); Hideji Wakabayashi, Basingstoke (GB); Yuxin Wei, Basingstoke (GB); Shinichiro Tsuda, Basingstoke (GB)

(73) Assignee: Sony Corporation, Tokyo (JP)

( * ) Notice: Subject to any disclaimer, the term of this patent is extended or adjusted under 35 U.S.C. 154(b) by 74 days.

(21) Appl. No.: 16/764,394

(22) PCT Filed: Nov. 15, 2018

(86) PCT No.: PCT/EP2018/081463
§ 371 (c)(1),
(2) Date: May 15, 2020

(87) PCT Pub. No.: WO2019/096949
PCT Pub. Date: May 23, 2019

(65) Prior Publication Data
US 2020/0383080 A1    Dec. 3, 2020

(30) Foreign Application Priority Data

Nov. 16, 2017   (EP) .................................... 17202195

(51) Int. Cl.
*H04W 64/00*   (2009.01)
*H04W 76/10*   (2018.01)
(Continued)

(52) U.S. Cl.
CPC ......... *H04W 64/00* (2013.01); *H04W 12/037* (2021.01); *H04W 28/04* (2013.01);
(Continued)

(58) Field of Classification Search
CPC ... H04W 64/00; H04W 12/037; H04W 76/10; H04W 28/04; H04W 74/004; H04W 88/02; H04W 92/10
See application file for complete search history.

(56) References Cited

U.S. PATENT DOCUMENTS 8,823,589 B2 *   9/2014   Wang .................... G01S 5/0242
                                                            342/463
2013/0324154 A1   12/2013   Raghupathy et al.
(Continued)

FOREIGN PATENT DOCUMENTS

CN          1837845 A    9/2006
CN        102347879 A    2/2012
(Continued)

OTHER PUBLICATIONS

International Search Report and Written Opinion dated Mar. 4, 2019 for PCT/EP2018/081463 filed on Nov. 15, 2018, 12 pages including English Translation of the International Search Report.
(Continued)

*Primary Examiner* — Charles N Appiah
*Assistant Examiner* — Frank E Donado
(74) *Attorney, Agent, or Firm* — Xsensus LLP

(57)   ABSTRACT

A terminal device is configured to detect a failure in communicating the position assistance information, such as a failure to decrypt or an integrity protection decoding failure, and in response to detecting the failure in communicating the position assistance information to perform a position assistance information failure procedure. In one example embodiment the position assistance information failure procedure includes transmitting a message indicating the failure to the infrastructure equipment. In another example the position assistance information failure procedure includes adapting one or more communications parameters in order to recover the reception of the position assistance information.

19 Claims, 6 Drawing Sheets

(51) Int. Cl.
  *H04W 28/04* (2009.01)
  *H04W 74/00* (2009.01)
  *H04W 12/037* (2021.01)
  *H04W 88/02* (2009.01)
  *H04W 92/10* (2009.01)

(52) U.S. Cl.
  CPC ......... *H04W 74/004* (2013.01); *H04W 76/10* (2018.02); *H04W 88/02* (2013.01); *H04W 92/10* (2013.01)

(56) References Cited

U.S. PATENT DOCUMENTS

| | | | |
|---|---|---|---|
| 2015/0208267 A1* | 7/2015 | Jung | H04W 24/10 |
| | | | 455/456.1 |
| 2016/0029162 A1* | 1/2016 | Edge | H04W 4/20 |
| | | | 455/456.1 |
| 2016/0109582 A1* | 4/2016 | Sendonaris | G01S 5/0236 |
| | | | 455/456.1 |
| 2021/0029573 A1* | 1/2021 | Siomina | H04W 72/0433 |

FOREIGN PATENT DOCUMENTS

| | | |
|---|---|---|
| CN | 103765927 A | 4/2014 |
| WO | 2013/033464 A2 | 3/2013 |
| WO | 2017/040076 A1 | 3/2017 |
| WO | 2019/086309 A1 | 5/2019 |

OTHER PUBLICATIONS

TSG-RAN WG2, "Draft LS to SA3 on SRB/DRB integrity check failure handling," 3GPP TSG-RAN WG2 Meeting #99bis, R2-1710328, Prague, Czech Republic, Oct. 9-13, 2017, 2 pages.

Huawei and Hisilicon, "UP integrity protection check failure handling in LTE-NR DC," 33GPP TSG-RAN WG2 Meeting #99bis, R2-1711094, Prague, Czech Republic, Oct. 9-13, 2017, 3 pages.

RAN2, "LS on encrypting broadcasted positioning data," 3GPP TSG-RAN WG2 Meeting #99Bis, R2-1712031, Prague, Czech Republic, Oct. 9-13, 2017, 1 page.

3GPP, "LTE; Digital cellular telecommunications system (Phase 2+); Universal Mobile Telecommunications System (UMTS); Functional stage 2 description of Location Services (LCS)," TS 23.271, Version 10.4.0, Release 10, Apr. 2013, pp. 1-170.

3GPP, "LTE; Evolved Universal Terrestrial Radio Access Network (E-UTRAN); Stage 2 functional specification of User Equipment (UE) positioning in E-UTRAN," TS 36.305, Version 10.0.0, Release 10, Jan. 2011, pp. 1-52.

3GPP, "LTE; Evolved Universal Terrestrial Radio Access (E-UTRA); LTE Positioning Protocol (LPP)," TS 36.355 version 14.2.0 Release 14, Jul. 2017, pp. 1-169.

Lu H. and Wu M., "An SUPL-Based Location Platform Implementation in Mobile Network," Proceedings of ICCTA, 2009, pp. 284-287.

5G, "The Mobile Broadband Standard," 3GPP Specification Series, 36, 6 pages, [Retrieved on May 6, 2020] Retrieved from the Internet:<https://www.3GPP.org/DynaReport/36-series.htm>.

5G, "The Mobile Broadband Standard," 3GPP Specification Series, 38, 3 pages, [Retrieved on May 6, 2020] Retrieved from the Internet: <https://www.3GPP.org/DynaReport/38-series.htm>.

* cited by examiner

ARRANGEMENT FOR RESPONDING TO A FAILURE IN THE COMMUNICATION OF THE POSITION ASSISTANCE INFORMATION

CROSS-REFERENCE TO RELATED APPLICATIONS

The present application is based on PCT filing PCT/EP2018/081463, filed Nov. 15, 2018, which claims priority to EP 17202195.8, filed Nov. 16, 2017, the entire contents of each are incorporated herein by reference.

BACKGROUND

Field of the Disclosure

The present technique relates to terminal devices which are configured to generate an estimate of a location of the terminal devices. The present technique also relates to infrastructure equipment and methods, which are configured to provide position assistance information which is used by communications terminals to generate an estimate of their location.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present invention.

Third and fourth generation mobile telecommunication systems, such as those based on the 3GPP ($3^{rd}$ Generation Partnership Project) defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things" (IoT), and may typically be associated with the transmissions of relatively small amounts of data with relatively high latency tolerance. Low complexity devices are also often low power devices, in which it is desirable for such devices to have a low power consumption (and therefore a long battery life).

Future wireless communications networks will be expected to routinely and efficiently support location based services with a wider range of devices/applications than current systems are optimised to support.

For example, it is expected that wireless communications in 5G will support geo-fencing services such as child location services, mobile coupons/advertisements which are triggered near a shop and airport automatic check-in at the gate/counter. These applications require continuous tracking of UE position or monitoring the equivalent trigger conditions with low UE power consumption.

In view of this there is expected to be a desire for future wireless communications networks, for example those which may be referred to as 5G ($5^{th}$ Generation) or new radio (NR) system/new radio access technology (RAT) systems, as well as future iterations/releases of existing systems, to efficiently support connectivity for a wide range of devices. In particular, the problem of how to efficiently transmit signals to and receive signals from low complexity devices whilst keeping the power consumption of such devices low needs to be addressed.

SUMMARY

The present technique is defined according to the claims. Embodiments of the present technique can provide an arrangement in which a terminal device is configured to receive a radio signal from one or more position detection signal emitting devices from which radio signals measurements can be made to assist in determining a position of the terminal device, and to detect position assistance information transmitted from an infrastructure equipment of a wireless communications network which can be used to estimate in combination with the measurements of the radio signal received from the position detection signal emitting devices an estimate of the position of the terminal device. The terminal device is configured to detect a failure in communicating the position assistance information such as a failure to decrypt or an integrity protection decoding failure, and in response to detecting the failure in communicating the position assistance information to perform a position assistance information failure procedure.

In one example embodiment the position assistance information failure procedure includes transmitting a message indicating the failure to the infrastructure equipment. In response the infrastructure equipment may, for example, stop sending encrypted position assistance information, or to change the key or key validity time associated with the position assistance information. In another example the position assistance information failure procedure includes adapting one or more communications parameters in order to recover the reception of the position assistance information.

Embodiments of the present technique can provide an arrangement in which a terminal device can recovery from a failure in communicating position assistance information which is used for estimating a location of the terminal device to update one or more communications parameters to recover the position assistance information.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

As mentioned above the embodiments of the present invention can find application with advanced wireless communications systems such as those referred to as LTE, 5G or New Radio Access Technology (NR). New Radio Access Technology has been proposed in [2] to develop a new Radio Access Technology (RAT) for the next generation wireless communication system, i.e. 5G. The new RAT is expected to operate in a large range of frequencies, from hundreds of MHz to 100 GHz and it is expected to cover a broad range of use cases. The use cases that are considered can include:
Enhanced Mobile Broadband (eMBB)
Massive Machine Type Communications (mMTC)
Ultra Reliable & Low Latency Communications (URLLC)

Figure 1:
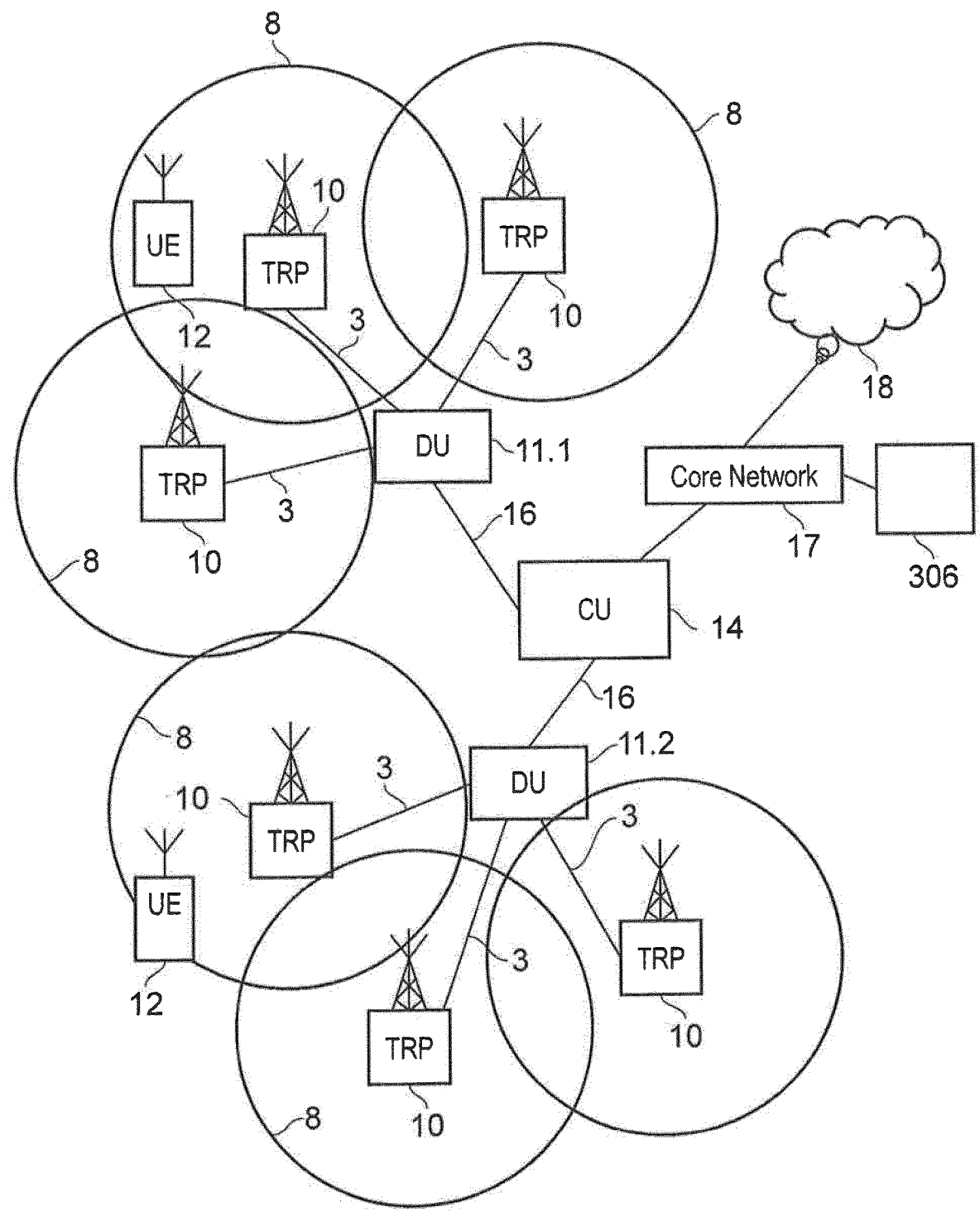
FIG. 1 is a schematic block diagram illustrating some basic functionality of a wireless communications system according to a 3GPP standard.

The aim of 5G is not only mobile connectivity for people, but to provide ubiquitous connectivity for any type of device and any type of application that would benefit from being connected. Many requirements and use-cases are still being discussed, but amongst those are:
Low latency
High data rates
Millimetre wave spectrum use
High density of network nodes (e.g. small cell and relay nodes)
Large system capacity
Large numbers of devices (e.g. MTC devices/Internet of Things devices)
High reliability (e.g. for vehicle safety applications, such as self-driving cars).
Low device cost and energy consumption
Flexible spectrum usage
Flexible mobility An example configuration of a wireless communications network which uses some of the terminology proposed for NR and 5G is shown in FIG. 1. In FIG. 1 a plurality of transmission and reception points (TRP) 10 are connected to distributed control units (DU) 11.1, 11.2 by a connection interface represented as a line 3. Each of the transmitter receiver points (TRP) 10 is arranged to transmit and receive signals via a wireless access interface within a radio frequency bandwidth available to the wireless communications network. Thus within a range for performing radio communications via the wireless access interface, each of the TRP 10, forms a cell of the wireless communications network as represented by a dashed line 8. As such wireless communications devices 12 which are within a radio communications range provided by the cells 10 can transmit and receive signals to and from the TRP 10 via the wireless access interface. Each of the distributed control units 11.1, 11.2 are connected to a co-ordinating unit (CU) 14 via an interface 16. The CU 14 is then connected to the a core network 17 which may contain all other functions required for communicating data to and from the wireless communications devices and the core network 17 may be connected to other networks 18.

The elements of the wireless access network shown in FIG. 1 may operate in a similar way to corresponding elements of an LTE network well-known and defined in the relevant standards administered by the 3GPP® body, and also described in many books on the subject, for example, Holma H. and Toskala A [1]. It will be appreciated that operational aspects of the telecommunications network represented in FIG. 1, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The transceiver processors TRP 10 of FIG. 1 may in part have a corresponding functionality to a base station or eNodeB of an LTE network, and so the terms TRP and eNodeB in the following description are interchangeable. Base stations, which are an example of radio network infrastructure equipment, may also be referred to as transceiver stations/NodeBs/eNodeBs (eNBs), and so forth. Similarly the communications devices 12 may have a functionality corresponding to devices know for operation with an LTE network and may also be referred to as mobile stations, user equipment (UE), user terminal, mobile radio, communications device, and so forth. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and terminal devices of a new RAT network will be functionally similar to, respectively, the core network component, base stations and terminal devices of an LTE wireless communications network.

As shown in FIG. 1, attached to the core network 1 is a location server 306. Embodiments of the present technique for application in navigation or location based services, which require that a UE generate an estimate of its geographic location. As will be explained with reference to FIG. 2, it is known to provide a location server to generate position assistance information which assists the UE to identify its location in combination with other measurements generated from received radio signals.

Compared to existing solutions for positioning (such as those proposed by 3GPP) it is desirable to provide improved positioning arrangements. The term "positioning" should be understood to refer to any process by which a UE determines its position in space (in particular, its geographical position).

The desired improvements include:
Variety of supported positioning methods/sensors
  Multiple GNSS satellites support
  Multiple indoor positioning sensors support
Higher position accuracy required
  Use high accuracy positioning with combination of GNSS (e.g. GLONASS (Globalnaya Navigazionnaya Sputnikovaya Sistema), Galileo, QZSS (Quasi-Zenith Satellite System))
  Hybrid operation with multiple sensors
  Outdoor/indoor seamless operation
Low power consumption
  Idle mode/inactive mode positioning/measurement
  No connected mode for getting assistance information
Large volume of positioning assistance information
  The number of supported GNSS is increased.
  To support network RTK (Real Time Kinematic), Precise Point Positioning (PPP)-RTK.
NR PHY (Physical)/Protocol new functions
  Introduction of on-demand system information (SI)
  Inactive mode operation in addition to idle mode, connected mode The following embodiments relate primarily to 5G (NR) positioning enhancements. However, it will be appreciate that the teachings provided may be applicable for LTE systems (e.g. LTE systems which support on-demand SI or similar, as may be available in the near future). The present technique may provide at least some of the above-mentioned improvements for both suitable LTE and NR systems.

An example of on-demand SI which may be used with embodiments of the present technique may be found in European patent application EP 16180858.9, for example.

Furthermore, information regarding existing 3GPP location based service and protocols may be found in the following white paper: LTE Location Based Services Technology Introduction (Rohde & Schwarz) http://www.rohde-schwarz-wireless.com/documents/LTELBSWhitePaper-_RohdeSchwarz.pdf, the contents of which are incorporated herein by reference.

Supported versions of UE positioning methods in LPP are disclosed in 3GPP TS36.305, for example, the contents of which are incorporated herein by reference.

In 3GPP, when a UE determines its spatial position, the measurement of signals (from GNSS satellites or the like) and the calculation of the UEs position based on those signals are distinguished. "UE-assistance positioning" refers to a situation in which a device external to the UE (such as a location server of a network to which the UE is connected) calculates the position of the UE according to the report of measurement results from the UE. The present technique, on the other hand, allows more "UE-based positioning", in which the UE is provided with sufficient information to calculate its position. In other words (as described in 3GPP TS 36.305 V13.0.0 (2015-12)), the suffixes "-based" and "-assisted" refer respectively to the node that is responsible for making the positioning calculation (and which may also provide measurements) and a node that provides measurements (but which does not make the positioning calculation). Thus, an operation in which measurements are provided by the UE to the E-SMLC (Evolved Serving Mobile Location Centre) to be used in the computation of a position estimate is described as "UE-assisted" (and could also be called "E-SMLC-based"), while one in which the UE computes its own position is described as "UE-based". UE-based positioning (as used with the present technique) requires less communication with the network compared to UE-assistance positioning, thus reducing the power consumption at the UE.

As previously mentioned, UE positioning may be carried out based on signals received from GNSS satellites. As discussed in https://www.gsa.europa.eu/system/files/reports/gnss_mr_2017.pdf, for example, Global Navigation Satellite System (GNSS) is the infrastructure that allows users with a compatible device (in this case, UE) to determine their position, velocity and time by processing signals from satellites. GNSS signals are provided by a variety of satellite positioning systems, including global and regional constellations and Satellite-Based Augmentation Systems:

Global constellations: Global Positioning System (GPS) (USA), Globalnaya Navigazionnaya Sputnikovaya Sistema (GLONASS) (Russian Federation), Galileo (EU), BeiDou (PRC).

Regional constellations: Quasi-Zenith Satellite System (QZSS) (Japan), Indian Regional Navigation Satellite System (IRNSS) (India), and BeiDou regional component (PRC).

Satellite-Based Augmentation Systems (SBAS): Wide Area Augmentation System (WAAS) (USA), European Geostationary Navigation Overlay Service (EGNOS) (EU), MTSAT Satellite Augmentation System (MSAS) (Japan), GPS Aided GEO Augmented Navigation (GAGAN) (India), System for Differential Corrections and Monitoring (SDCM) (Russian Federation) and Satellite Navigation Augmentation System (SNAS) (PRC).

A GNSS may have more than one band or code/signals. For example, GPS newly supports L2C signal (band L2, civilian GPS signal) in addition to conventional L1 C/A (band L1 and coarse/acquisition code). However, most of GPS terminals still support only L1 C/A.

GNSS assistance information via cellar network provides benefits for positioning. In particular, it allows some of the information required for the UE's position to be determined via GNSS to be provided to the UE via the network rather than directly from a satellite. In an embodiment of the present technique, GNSS assistance information may be transmitted to the UE in one or more system information blocks from the gNB 101 and received by the wireless communications receiver 202 of the UE 104. Other GNSS information is received directly from a satellite as part of the first signal by the first receiver 200 of the UE 104.

GNSS satellites transmit two type of signals, the codes and messages. The code is orthogonal code such as pseudorandom noise or the like. The messages includes the satellite orbit information such as Ephemeris and Almanac (which are needed for position estimation). Information regarding the Ephemeris and Almanac is provided in 3GPP TS 36.305 V13.0.0 (2015-12), for example. Here, it is defined that Ephemeris and Clock Models assistance provides the GNSS receiver (in this case, the UE) with parameters to calculate the GNSS satellite position and clock offsets. The various GNSSs use different model parameters and formats, and all parameter formats as defined by the individual GNSSs are supported by the signaling. It is also defined that Almanac assistance provides the GNSS receiver with parameters to calculate the coarse (long-term) GNSS satellite position and clock offsets. The various GNSSs use different model parameters and formats, and all parameter formats as defined by the individual GNSSs are supported by the signaling.

LPP supports the communication of a portion of the GNSS information (e.g. the messages) from a location server to a UE via an LTE base station as a faster complement to the transmission of this information from GNSS satellites.

Assistance information for positioning from the cellular network (that is, from a base station of the network) helps alleviate various problems associated with GNSS positioning, including those relating to the sensitivity of messages transmitted by GNSS satellites, the time to first fix and the provision of precise positioning.

In particular, the use of a cellular network helps alleviate satellite signal strength issues. A GNSS satellite signal is very weak due to the long distance between the UE and the satellites. The UE may also miss the signal due to having a relatively small GNSS antenna. It is noted that GNSS codes (in particular, GPS codes) require a lower signal to noise ratio (SNR) than GNSS messages (in particular, GPS messages). Thus, a situation may arise in which a UE can receive the GNSS codes, but cannot receive the GNSS messages. Furthermore, even if a UE can receive the message with high SNR, measurement time, which is called the time to first fix (TTFF), may be an issue. For example, GPS transmits the messages with very low bit rate (e.g. 50 bits/second). If a UE is to receive all necessary messages from a scratch (both Almanac and Ephemeris), this will take 12.5 minutes. By contrast, the cellular network provides a much higher bitrate and the UE is able to receive all necessary messages over a time period of the order of seconds.

The volume of GNSS assistance information is expected to be increased in the near future because of envisaged requirements for more accurate positioning. For example, JAXA (Japan Aerospace Exploration Agency) provides MADOCA (Multi-GNSS Advanced Demonstration tool for Orbit and Clock Analysis) for QZSS users, which needs precise point position (PPP). The assistance information from MADOCA is not only included in QZSS orbit and clock information, but is also used in other GNSS systems. However, the capacity of QZSS satellite communication (L-band) is limited. Highly common information which many users need may therefore be transmitted from the satellite. However, the remaining assistance information could be transmitted via other communication methods like (such as via the internet—for example, see https://ssl.tksc.jaxa.jp/madoca/public/public_index_en.html).

The above embodiments primarily relate to handling GNSS assistance information. However, the present technique may also be applied to positioning using other types of signal emitting devices which emit signals detectable by the UE. Such alternative positioning may be used in indoor public spaces (such as shopping centres, art galleries, museums and the like) in which it is not possible to obtain a satellite signal of sufficient strength and/or quality. In this case, information indicative of the position of one or more signal emitting devices is used in conjunction with a UE's distance from each signal emitting device (as measured based on a first signal from each signal emitting device by the first receiver 200 of the UE 104, for example) in order to determine the UE's position within the building. In this case, assistance information (indicative of the position of each of the one or more indoor signal emitting devices) could be transmitted to a UE via the network. More generally, the present technique may be implemented using one or more satellite or non-satellite signal emitting devices located at respective predetermined positions within a predetermined space. Various additional sensors may also be used for UE positioning, as explained later on. More information concerning the configuration of a UE to received assistance information is disclosed in EP17199204 the content of which are herein incorporated by reference.

In the context of 5G (NR) positioning, PVT estimation may not only use GNSS positioning (or, more generally, positioning based on one or more signal emitting devices, which may include GNSS satellites or indoor signal emitting devices), but also one or more other sensors of various types. Thus, in addition to or instead of the first receiver 200 being configured to receive a signal from one or more signal emitting devices, the first receiver 200 may also receive signals from one or more other sensors comprised as part of the UE 104. Such sensors may include accelerometers, gravimeters, barometer sensors, gyroscopic sensors or the like, and may be used in various ways in addition to or instead of GNSS or other emitted signals. The term "sensor" should be interpreted broadly as an element (implemented using circuitry, for example) configured to detect one or more characteristics on the basis of which a position of the UE (or at least one or more services applicable based on the position of the UE) may be determined. Various different types of sensor may be used in combination in order to carry out UE positioning.

As described above, it is expected future wireless communications networks will efficiently support communications with devices including reduced complexity devices or machine type communication (MTC) devices, which may be deployed for supporting the "The Internet of Things", and may typically be associated with the transmissions of relatively small amounts of data with relatively high latency tolerance.

Figure 2:
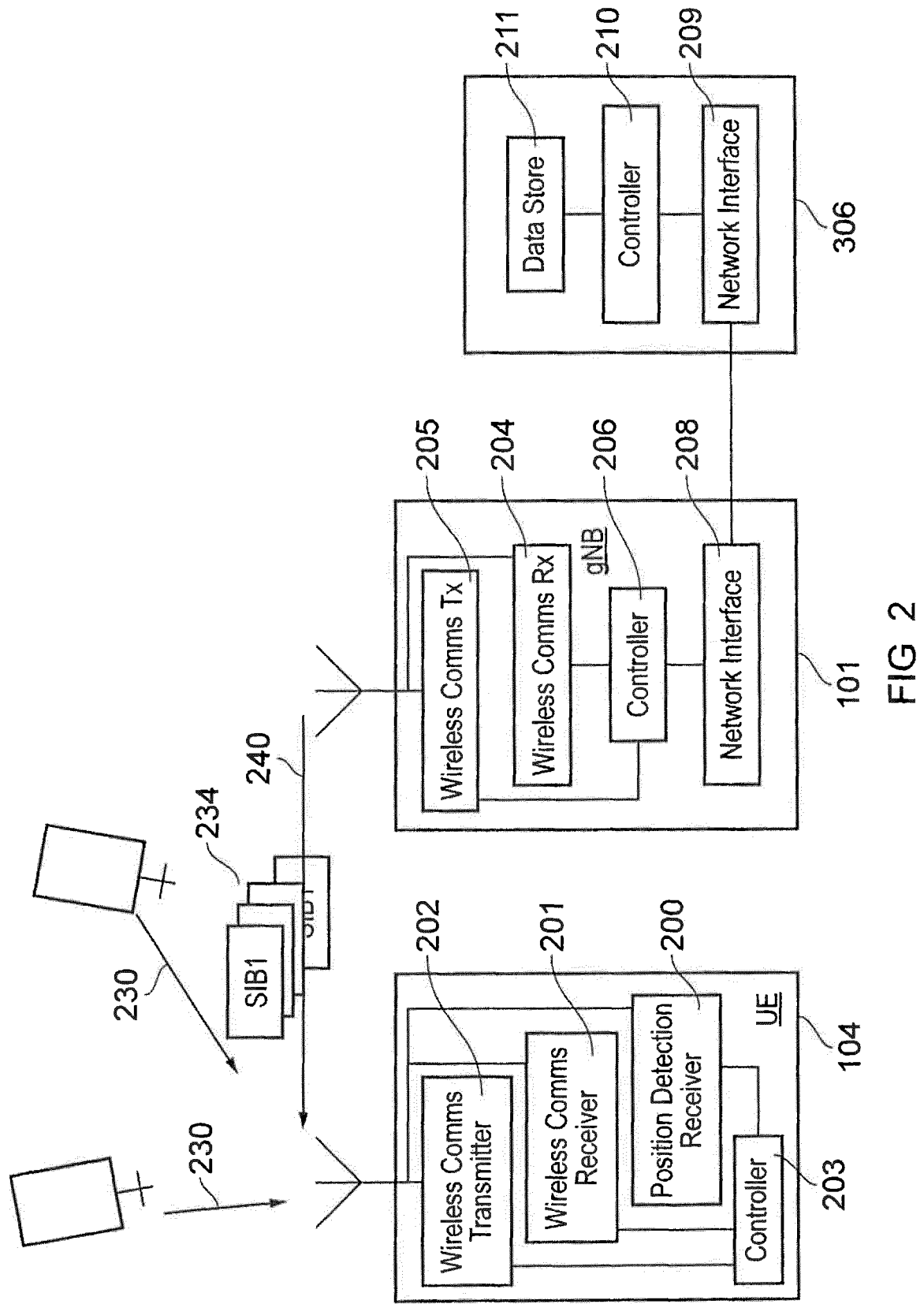
FIG. 2 is a schematic block diagram of a terminals device, an infrastructure equipment (gNodeB) and a location server which are configured to provide position assistance information to the terminal device for the terminal device to generate an estimate of its location according to an example embodiment of the present technique.

FIG. 2 schematically shows some components of a UE 104, a base station 101 and a data processing apparatus 306, which acts a location assistance server or SMLC according to an example embodiment of the present technique.

Embodiments of the present technique can provide an arrangement in which different items of position assistance information are communicated to terminal devices (UEs) in one or more system information blocks (SIBs) each different item providing a different level of assistance information to assist the UE to identify its location with a different level of accuracy. Furthermore as will be explained below in order to improve the integrity of the receipt of the information, a counter value may be used in each of a plurality of packets in which each different level of assistance information is carried to improve a likelihood of detecting an error in the integrity of the position assistance information which the one or more SIBs are carrying, or provide a facility for detecting a tampering or attack on the integrity of the positioning assistance information received by the UE.

In some embodiments, the different levels of position assistance information is provided in accordance with different subscription levels, by encrypting (ciphering) different position assistance information with different keys which may be carried in different SIBs. If, for example, there are five levels of positioning assistance information such that level one is free to all UEs and levels two to five are based on user's subscription then, in one example, levels two to five are encrypted with separate keys and broadcast in four different SIBs. In some embodiments level one provided in one of the SIBs (top-level SIB) indicates that the position assistance information provided in levels two to five are encrypted so that UEs without subscription do not waste power and drain their batteries trying to detect and to decode SIBs carrying levels two to five. Accordingly, other UEs with valid subscription are provided with an indication as to whether all levels are encrypted using the same key or different keys. This approach does not compromise security by informing if further SIBs are encrypted as it tells the status only but reduces trial and error mechanisms on the receiving side (UE). Therefore level one can be referred to as a top level SIB, which adapted to include an explicit indication of how the following SIBs are encrypted. This can include for examples that:
1. The following SIBs containing position assistance information are not encrypted;
2. The position assistance information in the following SIBs are encrypted using the same key;
3. The position assistance information in the following SIBs are encrypted using the same key different keys As shown in FIG. 2, the UE 104 comprises a position detection receiver 200, a wireless communications receiver 201, a wireless communications transmitter 202 and a controller 203. The position detection receiver 200 is for receiving wireless signals from each of one or more signal emitting devices located at respective spatial locations. Such signal emitting devices may be GNSS (Global Navigation Satellite System) satellites, for example. The wireless communications receiver 201 is for reception of wireless signals (e.g. radio signals) carrying user data from the wireless communications network of which the gNB 101 forms part. The wireless communications transmitter 202 is for transmitting wireless signals (e.g. radio signals). The controller 203 is configured to control the position detection receiver 200, wireless communications receiver 201 and wireless communications transmitter 202 and to control the UE 104 to operate in accordance with embodiments of the present disclosure. The controller 203 may comprise various sub-units for providing functionality in accordance with embodiments of the present disclosure as explained further below. The wireless communications receiver, the wireless communications transmitter, the position detection receiver and the controller may be implemented as discrete hardware elements or as appropriately configured functions of the controller 203. The controller 203 may be suitably configured/programmed to provide the desired functionality described herein using conventional programming/configuration techniques for equipment in telecommunications systems. The position detection receiver 200, wireless communications receiver 201, the wireless communications transmitter 200 and the controller 201 are schematically shown in FIG. 2 as separate elements for ease of representation. However, it will be appreciated that the functionality of these elements can be provided in various different ways, for example using a single suitably programmed computer, or suitably configured application-specific integrated circuit(s)/circuitry. It will be appreciated that, although not shown, the UE 104 will in general comprise various other elements associated with its operating functionality, such as a user interface, battery, and the like. In the following embodiments, the position detection receiver 200, the wireless communications receiver 201, transmitter 202 and the controller 203 are implemented as circuitry.

It will be appreciated by those skilled in the art that, in arrangements of the present technique, the transceiver 202 of the communications device 104 may not always include a transmitter, for example in scenarios where the communications device 104 is a low-power wearable device.

The base station 101 comprises a transmitter 205, a receiver 204, a network interface 208 and a controller 206. The transmitter 205 is for transmission of wireless signals (e.g. radio signals), the receiver 204 is for reception of wireless signals (e.g. radio signals), a network interface 208 for transmission and reception of signals (e.g. to and from a location server, as explained below) over a network such as the internet and the controller 206 is configured to control the transmitter 205, receiver 204 and network interface 208 and to control the base station 101 to operate in accordance with embodiments of the present disclosure. The controller 206 may comprise various sub-units for providing functionality in accordance with embodiments of the present disclosure as explained further below. These sub-units may be implemented as discrete hardware elements or as appropriately configured functions of the controller 206. The controller 206 may be suitably configured/programmed to provide the desired functionality described herein using conventional programming/configuration techniques for equipment in telecommunications systems. The transmitter 205, receiver 204, network interface 208 and controller 206 are schematically shown in FIG. 2 as separate elements for ease of representation. However, it will be appreciated that the functionality of these elements can be provided in various different ways, for example using a single suitably programmed computer, or suitably configured application-specific integrated circuit(s)/circuitry. It will be appreciated that, although not shown, the base station 101 will in general comprise various other elements associated with its operating functionality. In the following embodiments, the transmitter 205, receiver 204, network interface 208 and controller 206 are implemented as circuitry.

The data processing apparatus forming the eSMLC 306 comprises a network interface 209, a storage medium 211 and a controller 210. The network interface 209 is for transmission and reception of signals (e.g. to and from infrastructure equipment, as explained below) over a network such as the internet. The storage medium 211 is for storage of digital data (and may take the form of a hard disk drive, solid state drive, tape drive or the like, for example). The controller 210 is configured to control the network interface 208 and storage medium 211 and to control the data processing apparatus 306 to operate in accordance with embodiments of the present disclosure. The controller 210 may comprise various sub-units for providing functionality in accordance with embodiments of the present disclosure as explained further below. These sub-units may be implemented as discrete hardware elements or as appropriately configured functions of the controller 210. The controller 210 may be suitably configured/programmed to provide the desired functionality described herein using conventional programming/configuration techniques for equipment in telecommunications systems. The network interface 209, storage medium 211 and controller 210 are schematically shown in FIG. 2 as separate elements for ease of representation. However, it will be appreciated that the functionality of these elements can be provided in various different ways, for example using a single suitably programmed computer, or suitably configured application-specific integrated circuit(s)/circuitry.

It will be appreciated that, although not shown, the eSMLC 306 will in general comprise various other elements associated with its operating functionality. In the following embodiments, the network interface 209 and controller 210 are implemented as circuitry.

Embodiments of the present technique can provide improvements in providing position or location based services to UEs in accordance with different levels of position assistance information. According to the example embodiment presented in FIG. 2, the position detection receiver 200 is configured to receive one or more radio signals 230 from each of one or more signal emitting devices located at respective spatial positions. The controller 203 is arranged with the wireless communications receiver 201 and if required the wireless communications transmitter 202 to detect one or more system information blocks 234 carrying a plurality of different position assistance information transmitted from the gNB 101. Each of the plurality of different position assistance information providing information which can be used to assist in determining a position of UE with a different level of accuracy. According to the present technique one or more of the plurality of the different assistance information, carried by the one or more SIB 234 are encrypted, so that some discrimination can be provided in respect of the access of the assistance information to different UEs and/or given conditional access to the assistance information. As such, the UE is configured to identify one of the position assistance information for use by the UE to identify a position of the terminal device. The controller 203 is then arranged to estimate the position of the terminal device by combining the identified position assistance information with the radio signal 230 received by the position detection receiver circuitry 200. As such the position assistance information is identified in accordance with a permission allocated to the terminal device.

The System information blocks (SIB) 234 are known to be used within 3GPP to provide system information to UEs operating in a wireless communications network. The SIBs are broadcast by the gNBs to the UEs within the network in known resource elements of the wireless access interface. Before a UE can use a cell provided by a base station, the terminal is expected to carry out a series of steps. According to a conventional arrangement for other 3GPP systems like LTE, a UE detects a cell and cell-ID using the Primary Synchronisation Signal (PSS) and Secondary Synchronisation Signal (SSS) to detect the cell, and then receives a Master System Information Block (MIB) from the Physical Broadcast Channel (PBCH) and further System Information Blocks (SIB) from the PDSCH. More specifically a UE would have to first achieve time and frequency synchronisation with the cell, typically using the legacy PSS and SSS emitted by the base station. Then, the terminal will decode the PBCH to acquire the MIB. The MIB contains amongst other things information for the terminal to acquire further System Information, namely SIB1 that is transmitted via the PDSCH. SIB1 contains scheduling information for acquiring the remaining System Information portions (other SIBs). According to example embodiments of the present technique the plurality of different position assistance information is carried in one or more of these remaining SIBs. More information about SIBs can be found in TS 36.331.

According to example embodiments of the present technique, the wireless communications network is configured to transmit the one or more different position assistance information to the UEs within the SIBs. According to the example embodiment shown in FIG. 2, the one or more different position assistance information provides an indication of the respective spatial positions of each of the one or more signal emitting devices 232 with a different level of accuracy.

In some examples, the receiver 204 in the base station 101 is configured to receive a request message from the UE 104 (not shown) after the UE 104 has detected one or more radio signals 230 transmitted from each of one or more signal emitting devices 232 located at respective spatial positions. The controller 206 in the base station 101 is configured, in response to the request message, to determine the respective spatial positions of each of the one or more signal emitting devices 232. The transmitter 205 is configured to transmit position assistance information indicating the respective spatial positions of each of the one or more signal emitting devices within a predetermined system information block (SIB).

In some embodiments, the controller 203 of the UE 104 is configured to determine the spatial position of the terminal device with respect to each of the one or more signal emitting devices based on a measurement of a characteristic (e.g. signal strength and/or quality) of the one or more radio signals 230 transmitted by each of the one or more signal emitting devices 233. The position assistance information indicates the respective spatial position of each of the one or more signal emitting devices 232. The controller 203 is then able to calculate the absolute position of the UE 104 in a given coordinate system based on the determined spatial position of the terminal device with respect to each of the one or more signal emitting devices and the respective spatial position of each of the one or more signal emitting devices (such calculation techniques are known in the art and will therefore not be discussed here).

Embodiments of the present technique can provide an efficient way of communicating the position assistance information to UEs via the SIBs. In some embodiments, the same SIB may contain position assistance information which is encrypted (ciphered) using different keys. According to this example, the position assistance information is ciphered first and then encoded and put inside a radio resource control (RRC) packet data unit (PDU) in the location server (SMLC). Accordingly, the RRC PDU contains ciphered text as bit string or octet container or transparent container. A UE can decode the RRC PDU first and then perform deciphering or decrypting of the position assistance information. According to some embodiments therefore deciphering can be done in a packet data convergence protocol (PDCP) sublayer if the location server 306 performed ciphering after the RRC PDU. As such, a PDCP entity may not be required in the location server (e-SMLC) and a PDCP entity in the eNB can be used to perform the ciphering/deciphering. Since encryption is performed in the location server (e-SMLC) then some sort of PDCP-like entity may also be present in location server (e-SMLC). According to this arrangement a PDCP entity on UE side can be reused to avoid an increase in UE complexity and implementing the same functionality at different protocol layers. The PDCP entity is therefore responsible for radio bearer ciphering and integrity, so that within the UE a PDCP entity can perform deciphering/decrypting of the position assistance information received in system information.

As will be appreciated, a detailed mechanism for encrypting or ciphering are not necessary for understanding embodiments of the present technique. Examples may be included in radio bearer security based on EAP-AKA procedure and SA3 may decide an encryption certificate or PMK based key generation for positioning information. For the example in which separates SIB carry the different levels of position assistance information then each SIB may use a different encryption key. However, in other examples a single SIB may be used to carry all of the plurality of different levels of position assistance information. For this example an exchange of RRC PDUs or containers may be made more than once between RRC and PDCP layers. As mentioned above, PDCP functionality in the UE is reused for decryption whereas from a protocol layer principle, decryption is performed in LPP layer. If PDCP is used in the UE for decryption then duplication of functionality can be avoided in the function. If a single SIB is received with different keys used for encryption then the LPP RRC layer will receive a complete PDU first and then pass it on to PDCP layer to decrypt. In case one SIB contains data encrypted with single key the PDCP layer can decrypt the whole packet and then send it to an upper LPP RRC layer.

As will be appreciated from the above explanation, the terms encrypting/decrypting and ciphering/deciphering should be understood as being interchangeable in the description of the disclosed embodiments.

Figure 3:
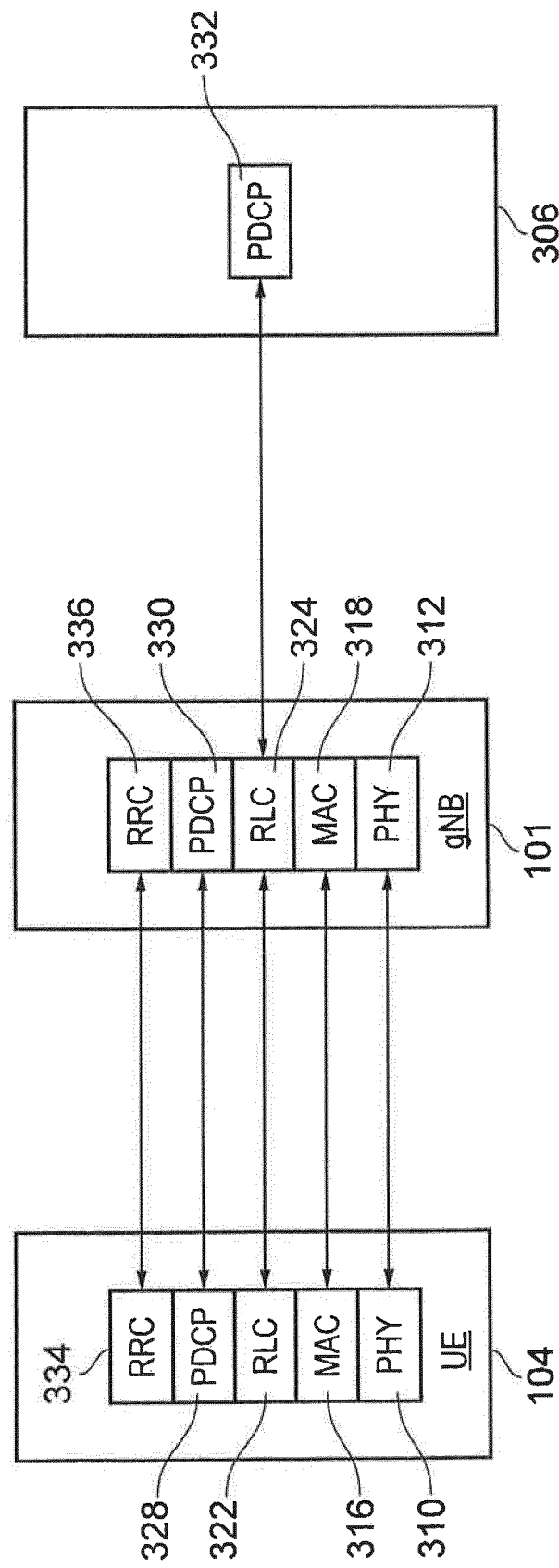
FIG. 3 is a schematic block diagram representing a protocol stack within the terminal device, the infrastructure equipment and the location server.

As shown in FIG. 3 a typical protocol stack is shown for each of the UE 101, the gNodeB 104, and the location server 306. In accordance with a known arrangement a lowest physical layer provides the physical resources to communicate information received from a medium excess control layer 316, 318, 320. As according to the conventional arrangement in which a radio network is used to communicate information, a radio link control layer 322 and 324 is provided for controlling the radio medium via the medium access control layer 318 316 320. As it will be appreciated because the location server 306 does not form part of the radio network, this does not include a radio link control layer.

Each of the UE, the gNode B and the location server 310 312 306, includes packet data convergence protocol (PDCP) layer 328, 330, 332 which is configured to form the data for transmission into packets as service data units (SDUs) for transmission via the other communications protocol layers. As shown in FIG. 3 at a highest layer there is a radio resource control (RRC) layer 334, 336 within the UE and the gNodeB but not correspondingly in the location server 306.

Figure 4:
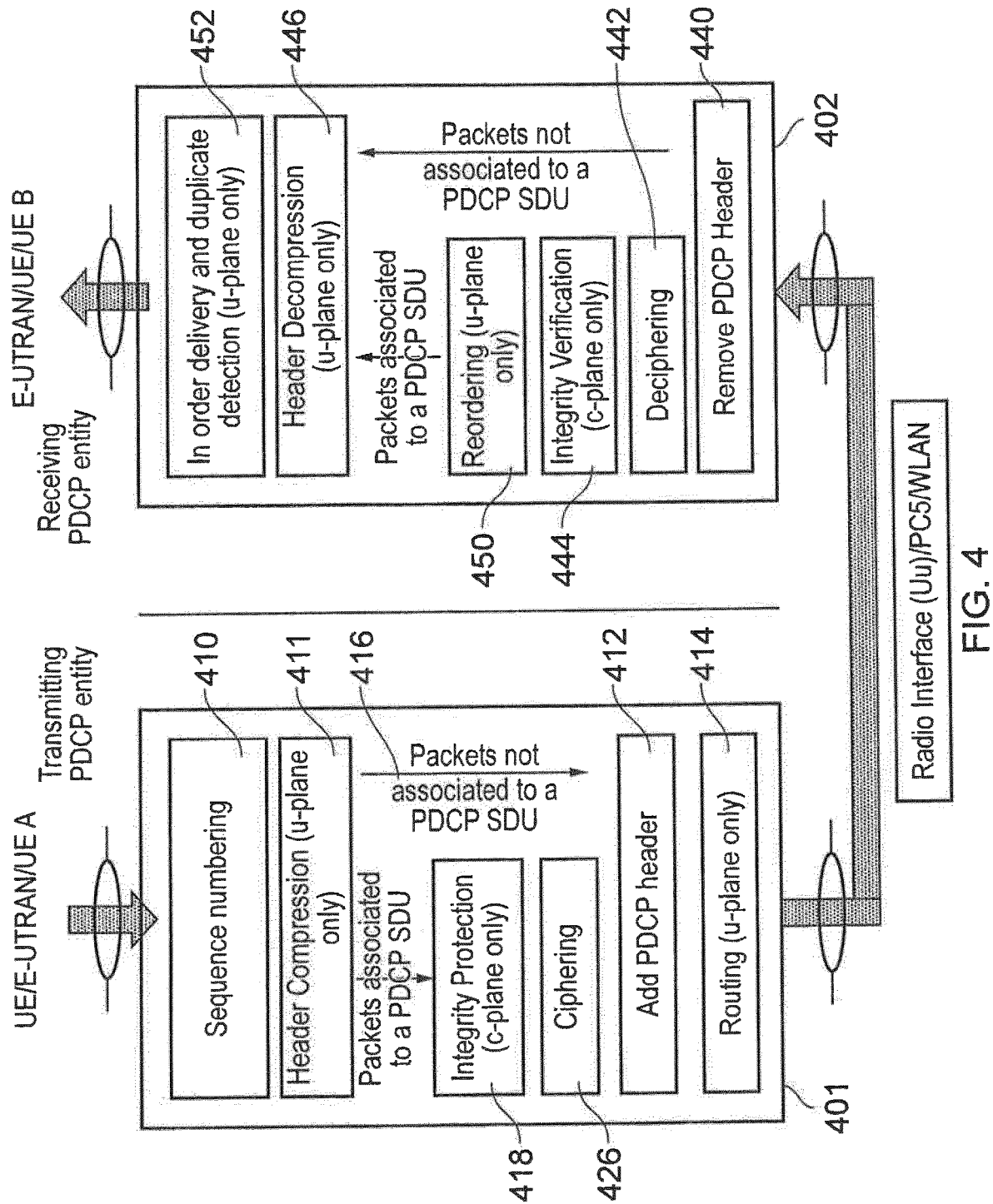
FIG. 4 is a schematic block diagram of an example of functional blocks which form a Packet Data Convergence Protocol (PDCP) entity within a transmitter and a receiver forming part of the PDCP layer of the terminal device, the infrastructure equipment and the location server shown in FIG. 3 according to one example embodiment.

As explained above, in some embodiments of the present technique encryption of the position assistance information for communication to the UE from the network via the SIBs is performed at the PDCP layer which includes a form of ciphering. A typical arrangement of the PDCP layer is shown in FIG. 4. FIG. 4 provides a general block diagram corresponding to the communication of user plane data and control plane data. According to the diagram shown in FIG. 4, data is communicated from a transmitting entity 401 and a receiving entity 402. On the transmitting side 401 data received as user plane data is received by a sequence numbering block 410 which adds a sequence number which is then fed to a Header Compression block 411 in which the header of the received user plane data is compressed. User plane data as shown is then fed to an Add PDCP header block 412 and a routing block 414 which is routed to the corresponding receiving PDCP entity 402. This is represented by an arrow 416 which shows that the packets not associated to a PDCP SDU are processed in accordance with the user plane transmission. The control plane data packets which are associated with an SDU are processed by adding or encoding the data to provide integrity protection in an integrity protection block 418 and are then ciphered using a cipher block 420 before a PDCP header is added in block 412.

Correspondingly on the receiving side the received SDUs are fed to a PDCP header removal block 440 before being deciphered by deciphering block 442. An integrity verification block 444 is then used to verify the integrity of the control plane data. Packets (PDUs) which are not associated with a PDCP SDU are sent to the header decompression block 446. A reordering block 450 reorders the data if the data carried is user plane data. A final block 452 is used to test the order and deliver of the user plane data to a higher layer entity.

As shown in FIG. 4 a ciphering block 420 on the transmitter side 401 and a deciphering block 442 on the receiving side provides a facility for encrypting data. According to the present technique therefore the position assistance information transmitted by the SDU from the PDCP entity within the network is transmitted to the UE by the PDCP layer. Within the PDCP layer the position assistance information is encrypted for transmission in one or more system information blocks. As shown therefore in FIG. 3, the PDCP entity in the location server 306 can transmit an SDU containing the encrypted position assistance information to the gNodeB 101 and which is then transmitted from the PDCP layer of the gNodeB to the UE via the system information block.

With regard to the example shown in FIG. 4, an adaptation can be made to the effect that a modified PDCP PDU header can be attached to RRC PDU, whereby RRC PDU contains a positioning SIB. According to this arrangement a Robust Header Compression (ROHC) is not needed. A PDCP system number (SN) is needed to ensure count value and SN could be smaller than a current value.

Figure 5:
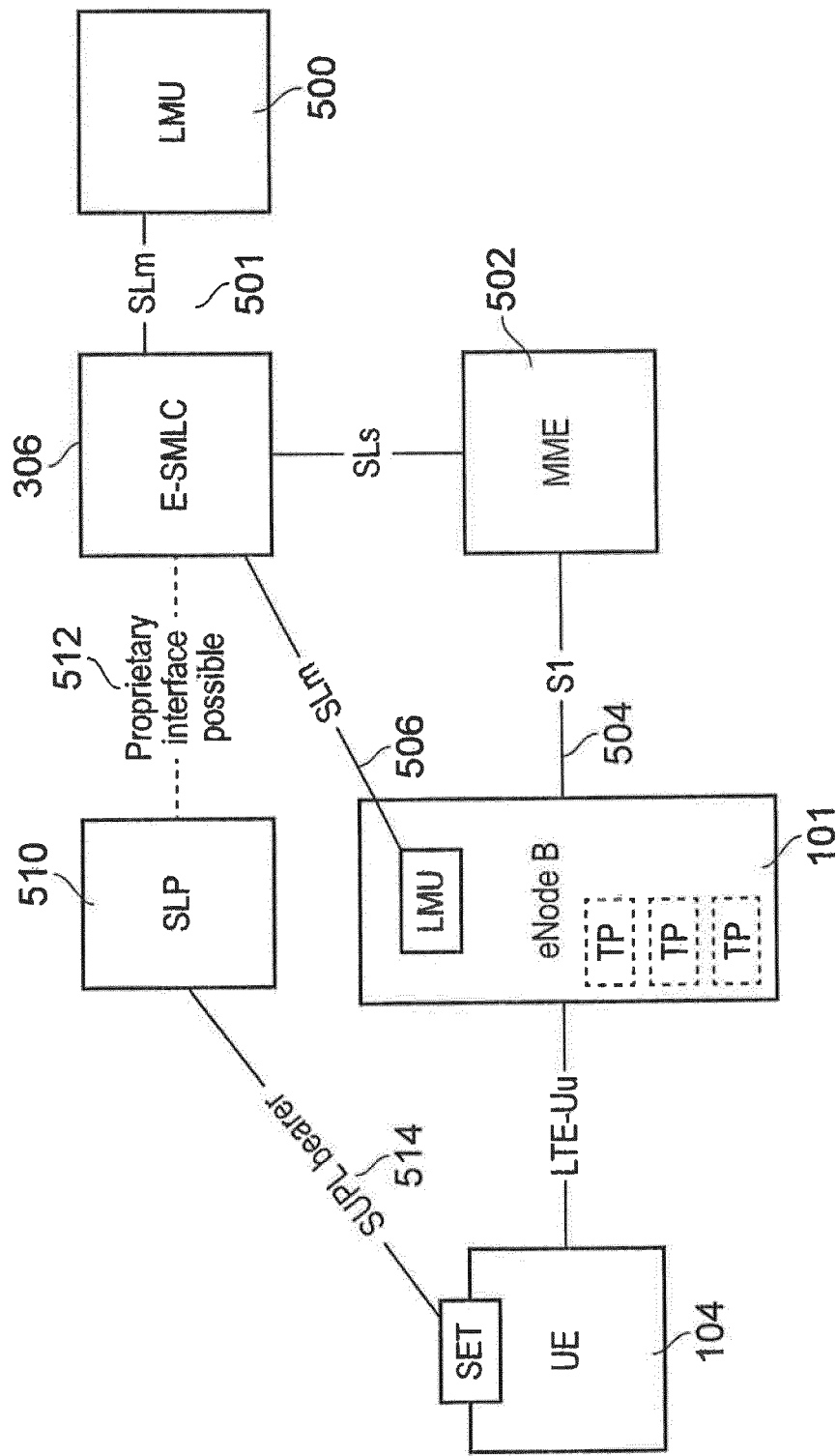
FIG. 5 is a schematic block diagram of parts of the wireless communications system shown in FIG. 1 associated with providing location services to a communications device.

FIG. 5 provides a schematic block diagram of elements of a mobile radio network corresponding to those shown in FIGS. 2, 3 and 4 in which the position information is communicated to the UE in encrypted form. As shown in FIG. 5 in one example the location server 306 is an enhanced location server (eSMLC) which interfaces with an LMU 500 via an SLm interface 501. A mobility management entity 502 interfaces with eSMLC 306 via an SLs interface and to the gNode B 101 via an S1 interface 504. The eSMLC 306 also interfaces with the gNode B 101 via an SLm interface 506. The eSMLC also interfaces with an SLP 510 via a proprietary interface 512 and to the UE via an SUPL bearer 514.

According to the present technique ciphering of the position assistance information is performed within the eSMLC which is then deciphered at the UE in which the UE 104 use the PDCP layer to communicate the position assistance information which is encrypted and transported as system information blocks. Communicating the position assistance information as packets via the PDCP layer also provides an inherent local authentication procedure using a count value of the data transmitted. Accordingly the count value can be used to check that the position information data has been correctly received at the UE.

One problem with communicating position assistance information to UEs is that the position assistance information may be tampered with, for example by a malicious attacker inserting packets mid-way by either a malicious base station or any other entity. Conventionally RRC messages are exchanged in a connected mode, in which the packets are integrity protected in order to avoid replay and for example where position assistance information is sensitive for applications like Vehicle communication, industrial automation etc. According to some example embodiments a counter check procedure can be introduced to improve the integrity protection and provide some level of anti-tampering. This is in contrast to a current counter check procedure which is run for ciphering only and only for dedicated radio bearers (DRB s) and not for integrity protection. Integrity protection is enabled only for RRC signaling in LTE.

It is also envisioned that encryption is performed with a pre-shared key and this key is updated regularly in order to ensure that position assistance information can be updated. Based on this information the UE can log a number of packets received with each key or for a duration when the key is valid and then report this back to the network.

According to one example, the UE can report periodically or once connected to the network or once it found a missing sequence number (non-consecutive sequence number). The wireless communications network can ensure at a later stage if there was some attempt to break the security. An indication that an attempt to break security was made can be reported to the location server (SMLC) directly using an LPP protocol. This proposed change does not depend on a PDCP entity being involved. However if there is a PDCP entity, then this entity can be used to report the indication that there has been an attempt to break the security.

Figure 6:
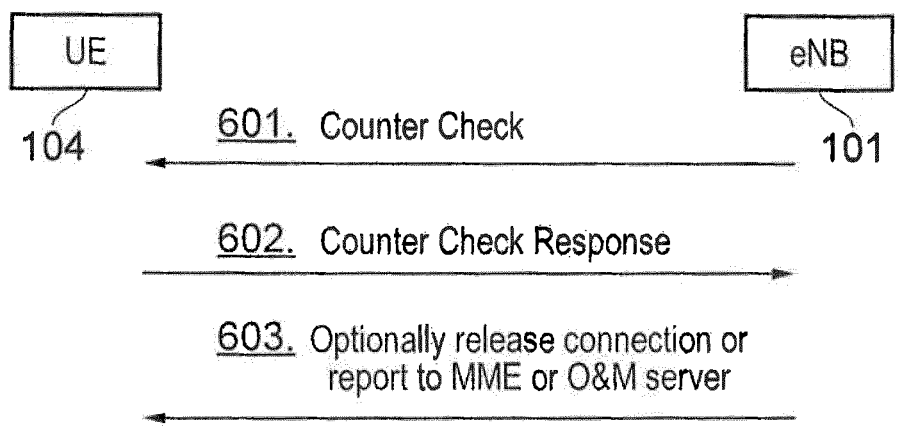
FIG. 6 is an example of a message exchange diagram in which a counter value of data items conveying position assistance information is queried to check an integrity of the position assistance information according to an example embodiment of the present technique.

FIG. 6 provides an example embodiment of the counter check procedure in accordance with the present technique. According to this counter check procedure an amount of data sent in each packet data unit is periodically checked by the gNodeB and the UE for both up and downlink communications. In accordance with embodiments of the present technique however the units of data of the position assistance information for each of the plurality of different position information levels are given a number representing a count of a sequential order of the position information transmitted from the gNodeB to the UE 104. The counter value can be for example included within the PDCP layer when this is processed within the gNodeB 101 and UE 104. As shown in FIG. 6 a counter procedure check can triggered by the gNodeB 101.

In some examples, the counter check procedure could be triggered by the location server (SMLC) or via the gNode B itself. Furthermore the network entity which is communicating the position information from the PDCP entity within that network entity can trigger information concerning the counter check procedure. A network entity having an LPP entity that is to say no PDCP entity can also trigger the counter check procedure.

As shown in FIG. 6 in the example in which the gNodeB 101 triggers the counter check procedure, the gNodeB sends a counter check message 601 to the UE 104. In response the UE sends the counter check response message 602 in which it provides an indication of the count of the position information item to the gNodeB 101. FIG. 6 is therefore an example of performing counter check procedure in RRC_CONNECTED mode. According to this counter check procedure a UE cannot send an uplink RRC message in IDLE mode. The gNodeB 101 then performs a counter check by comparing a count value for data communicated for the position information item to the UE 104 and yet this does not satisfy the counter check in that the count value of the number of data items for the position information item does not agree with that transmitted from the gNode B 101 then the gNode B 101 can transmit a connection release or report to the MME or the Operations and Maintenance centre that the counter check procedure has failed.

In one example a location server performs a counter check procedure. According to this example the location server maintains PDCP COUNT like mechanism, in which packet data units formed within a packet data protocol convergence entity within the wireless communications network, for example within the gNodeB 101, are used to carry the position assistance information. According to this example, if a UE has identified one of the different position assistance information, for example providing an accuracy at level two, then the count value for this will be different to a UE receiving level five information. According to one examples, a counter value is maintained per SIB or per level of information.

According to some example embodiments a PDCP entity in the eNB/gNB or at a centralized location is configured to perform the counter check or similar procedure. According to this arrangement a counter procedure is applied for each level of position assistance information. According to one example the counter check is initiated per SIB type including different encryption level rather than at the radio bearer.

In other examples, rather than the counter number of data items representing the position assistance information being monitored at the PDCP layer, the counter number of data items is maintained and monitored at the application layer.

Failure of Position Assistance Information

Embodiments of the present technique can provide an arrangement for responding to a failure in the communication of the position assistance information. The failure may for example be caused by a detection in the failure of the position assistance information, which has been encoded for transmission, or there could be a failure in decrypting or deciphering the position assistance information.

It is known within 3GPP communications systems to detect a decryption failure to provide a recovery procedure. For example, if a UE is unable to decipher a received PDCP packet data unit (PDU) then PDU is discarded but without any indication/information to the wireless communications network. As will be appreciated, ciphering requires that parameters associated with the ciphering are exchanged in different steps between the UE and the wireless communications network. In respect of integrity performance, a recovery procedure is performed if the UE encounters an integrity protection check failure while exchanging data/control signaling on a radio bearer. According to the recovery procedure the UE performs an RRC re-establishment procedure. In case of dual connectivity and integrity protection check failure in the SCG, the UE performs SCG-failure procedure to inform the wireless communications network.

Errors can also occur at handover when the UE could select the wrong target gNB. In the case of handover failure an RRC reestablishment message will not be decoded and so no user data exchange will take place.

In another example, as explained above, a counter check procedure for position assistance information is defined to check and verify reception of data correctly. Furthermore, when data in system information has been ciphered then it is possible to detect a mismatch in ciphering and deciphering based on certain input parameters. Some of the input parameters of the ciphering/deciphering parameters are: HFN/SFN, ciphering key, Count Value, sequence number, security algorithm etc. Accordingly therefore deciphering failure can occur if one or more of these parameters have a mismatch.

As will be appreciated, the UE can be in either Idle mode, INACTIVE mode or an RRC_Connected state while receiving encrypted positioning assistance information from system information blocks.

Embodiments of the present technique can provide an arrangement in which a UE can react to an indication that communication of the position assistance information has failed. The failure in the communication can be as a result for example of a failure in an integrity check of the position assistance information or a failure to decipher the position assistance information. Embodiments of the present technique can provide an arrangement in which a UE informs the wireless communications network when the UE detects a failure in the communication of the position assistance information. Examples of how the UE can inform the wireless communications network of a failure in communication of the position assistance information:

1. UE in IDLE mode triggers RRC Connection establishment procedure and the trigger is integrity check failure for encrypted data in system information.
2. Further, UE informs integrity failure either in MSG3 or MSG 5 or RRC reconfiguration message. Alternatively, the location server 306 (SMLC) is informed that there has been a failure in the communication of the position assistance information, which may be because for example the base station has been compromised. If the UE wants to connect to the location server then currently it is done via MME, because access Stratum (AS) security is always activated for an LPP message exchange between the UE and the location server (SMLC). When the UE receives assistance information via the SIBs then it is possible that the LPP messages between the UE and the location server (SMLC) are sent without AS security. According to this example therefore information is transmitted to the location server (SMLC) in LPP message protected with or without AS security.
3. In one example a UE may perform a random access procedure to inform the network of a failure of the position assistance information. To this end, in one example, the wireless communications network may reserve a preamble for informing the wireless communications network of the integrity failure. This is based on reusing an on-demand system information requesting procedure disclosed in EP17199204, the contents of which are incorporated herein by reference. According to this on-demand requesting procedure a UE generates a request message in response to detecting radio signals from location detection signal emitting devices 232 by a position detection receiver 204 at the UE 104. This on-demand requesting procedure is adapted to include a special preamble reserved for identifying a failure in the communication of the position assistance information.
4. Following a detection of a failure in the communication of the position assistance information, the UE changes from an INACTIVE mode to an RRC_Connected mode. However in some examples, if data transmission is permitted in an INACTIVE mode then the UE remains in the INACTIVE mode and transmits an indication that there has been a failure in the communications of the position assistance information. Alternatively, the UE can trigger an autonomous action and move to an IDLE mode, in consideration that UE security has been compromised or input parameters need to be updated (then move to RRC_Connected mode).
5. When the UE is in the Connected mode and receiving position assistance information via system information blocks, when the detection of the failure of the communications of the position assistance information occurs, then the UE performs an RRC re-establishment procedure with a new cause value clearly indicating that the re-establishment is triggered due to failure in the communication of the position assistance information.
6. As an alternative, if the UE is in the Connected mode and detects the failure of communicating the position assistance information, then the UE does not perform RRC re-establishment but informs the location server SMLC about integrity failure in order to receive updated parameters.
7. According to some examples the UE can log and report the failure in communicating the position assistance information as part of SON/MDT measurements (post processing and not real time reporting). That is to say because the encryption keys may have a validity time within each validity time, the UE either counts received packets and matches these against the number of packets transmitted by the eNB or location server (eSMLC). Alternatively the UE declares that it is simply unable to decrypt the received SIBs and assumes that its encryption key and subscription are still valid and informs the network accordingly.
8. According to one embodiment, a PDCP entity in the UE performs integrity and deciphering of received encrypted system information and so the PDCP entity needs to inform the RRC or LPP-RRC entity about the integrity and deciphering failure. The RRC entity will take action as explained above. In some examples the PDCP entity performs deciphering and integrity checking (ciphering is performed in SMLC RRC entity on the network side).
9. According to some examples, the UE then connects to the wireless communications network to receive updated information so that deciphering and integrity check is performed successfully.

As will be appreciated from the above explanation, according to some embodiments, the steps 1 to 8 can be used in principle to send a Counter Check response with new trigger type as counter check response.

Various embodiments of the present technique are defined by the following numbered clauses:

Clause 1. A terminal device for use in a wireless telecommunications network, the terminal device comprising
  wireless communications receiver circuitry configured to receive signals from the infrastructure equipment via a wireless access interface provided by the infrastructure equipment,
  position detection receiver circuitry configured to receive a radio signal from one or more position detection signal emitting devices from which radio signal measurements can be made to assist in determining a position of the terminal device, and
  controller circuitry configured
  to control the wireless communications receiver circuitry to detect position assistance information transmitted from the infrastructure equipment which can be used to estimate in combination with the measurement of the radio signal, received from the one or more position detection signal emitting devices, the position of the terminal device, wherein the controller circuitry is configured with the receiver circuitry to detect a failure in communicating the position assistance information, and
  in response to detecting the failure in communicating the position assistance information to perform a position assistance information failure procedure.

Clause 2. A terminal device according to Clause 1, wherein the position assistance information failure procedure includes adapting one or more communications parameters in order to recover the position assistance information received from the infrastructure equipment.

Clause 3. A terminal device according to Clause 2, comprising
  transmitter circuitry configured to transmit signals via the wireless access interface to the infrastructure equipment of the wireless communications network, wherein the controller circuitry is configured in combination with the transmitter circuitry to transmit a message to the wireless communications network indicating that there has been a failure in communicating the position assistance information as part of the position assistance information recovery procedure.

Clause 4. A terminal device according to Clause 3, wherein the controller circuitry is configured with the transmitter circuitry to transmit the message indicating that there has been a failure in communicating the position assistance information by transmitting a preamble as part of a random access procedure, the preamble being known to the wireless communications network to represent an indication that there has been a failure in communicating the position assistance information.

Clause 5. A terminal device according to Clause 3 or 4, wherein the message is transmitted when the terminal device is in an idle mode in which the device is not configured to transmit signals to the wireless communications network.

Clause 6. A terminal device according to any of Clauses 2 to 5, wherein the controller circuitry is configured with the transmitter circuitry to transmit the message indicating that there has been a failure in communicating the position assistance information, when the terminal device is in a connected mode in which the transmitter circuitry is configured to transmit signals representing data to the wireless communications network, the message being transmitted to a location server via the wireless communications network to indicate that the terminal device cannot decrypt the position assistance information and in response to receive the updated encryption parameters from the location server.

Clause 7. A terminal device according to any of Clauses 1 to 6, comprising transmitter circuitry configured to transmit signals via the wireless access interface to the infrastructure equipment of the wireless communications network, wherein the controller circuitry is configured in combination with the transmitter circuitry to perform the position assistance information failure procedure when in an idle mode in which the transmitter is configured not to transmit data to the infrastructure equipment to trigger a radio resource control connection establishment procedure in which the one or more adapted communications parameters are received.

Clause 8. A terminal device according to any of Clauses 1 to 7, wherein the controller circuitry is configured with the receiver circuitry to receive the position assistance information as the radio resource control layer encoded packet data unit, to decode the encoded packet data unit in accordance with a radio resource control, RRC, layer and to decrypt one or more of the encrypted position assistance information as a packet data convergence protocol, PDCP, layer, and the position assistance information failure procedure includes the PDCP layer informing the RRC layer of the failure in communicating the position assistance information.

Clause 9. A terminal device according to any of Clause 1 to 8, wherein position assistance information comprises a sequence of data items which are received sequentially, and each of the data items of the sequence includes a counter number corresponding to a sequential number of the order of the data units from which the data units were transmitted, and the controller circuitry is configured to detect a failure in communicating the position assistance information from the counter number of the received data items not being a sequential order.

Clause 10. A terminal device according to Clause 9, wherein the controller circuitry is configured to form a packet data convergence protocol layer and to receive the position assistance information at the packet data convergence protocol layer as one or more packet data units, the packet data units being the data items of the position assistance information and each of the packet data units including the counter number corresponding to a sequential number of the order in which the packet data units were transmitted from a packet data convergence layer entity formed within the wireless communications network which transmitted the packet data units.

Clause 11. A terminal device for use in a wireless telecommunications network, the terminal device comprising
wireless communications receiver circuitry configured to receive signals from the infrastructure equipment via a wireless access interface provided by the infrastructure equipment,
position detection receiver circuitry configured to receive a radio signal from one or more position detection signal emitting devices from which radio signal measurements can be made to assist in determining a position of the terminal device, and
controller circuitry configured
to control the wireless communications receiver circuitry to detect position assistance information transmitted from the infrastructure equipment which can be used to estimate in combination with the measurement of the radio signal, received from the one or more position detection signal emitting devices, the position of the terminal device, the position assistance information having been encrypted and encoded for integrity protection, wherein the controller circuitry is configured with the receiver circuitry in response to detecting a failure in the encryption or the integrity protection to perform a position assistance information failure procedure.

Clause 12. A terminal device according to Clause 11, wherein the position assistance information failure procedure comprises when the terminal device is in an idle mode triggering an RRC Connection establishment procedure.

Clause 13. A terminal device according to Clause 11 or 12, wherein the position assistance information failure procedure comprises the terminal device informing the wireless communications network using either in MSG3 or MSG 5 or RRC reconfiguration message.

Clause 14. A terminal device according to any of clauses 11 to 13, wherein the position assistance information failure procedure comprises the terminal device performing a random access procedure to inform the network of a failure of the position assistance information.

Clause 15. A terminal device according to any of clauses 11 to 14, wherein the position assistance information failure procedure comprises the terminal device changing from an INACTIVE mode to an RRC_Connected mode.

Clause 16. A terminal device according to any of clauses 11 to 15, wherein the position assistance information failure procedure comprises when the terminal device is in the Connected mode and receiving position assistance information via system information blocks, performing an RRC re-establishment procedure indicating a failure in the communication of the position assistance information.

Clause 17. A terminal device according to any of clauses 11 to 16, wherein the position assistance information failure procedure comprises if the terminal device is in the Connected mode and detects the failure of communicating the position assistance information, informing the location server SMLC about integrity failure in order to receive updated parameters.

Clause 18. A terminal device according to any of clauses 11 to 17, wherein the position assistance information failure procedure comprises the terminal device logging the failure in communicating the position assistance information as part of SON/MDT measurements.

Clause 19. A terminal device according to any of clauses 11 to 18, wherein the position assistance information failure procedure comprises a PDCP entity in the terminal device performing integrity and deciphering of received encrypted system information and informing the RRC or LPP-RRC entity about the integrity and deciphering failure.

Clause 20. A terminal device according to any of clauses 11 to 19, wherein the position assistance information failure procedure comprises connecting to the wireless communications network to receive updated information so that deciphering and integrity check is performed successfully.

Clause 21. A method by a terminal device of generating an estimate of a position of the terminal device, the method comprising receiving a radio signal from one or more position detection signal emitting devices from which one or more radio signal measurements can be made to assist in determining a position of the terminal device, and detecting position assistance information transmitted from an infrastructure equipment of the wireless communications network which can be used to estimating, in combination with the one or more radio signal measurements of the radio signal received from the one or more position detection signal emitting devices, the position of terminal device, wherein the detecting position assistance information includes detecting a failure in communicating the position assistance information, and in response to detecting the failure in communicating the position assistance information performing a position assistance information failure procedure.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] http://www.3gpp.org/DynaReport/36-series.htm
[2] http://www.3gpp.org/DynaReport/38-series.htm
[3] 3GPP TS 36.305: "Stage 2 functional specification of User Equipment (UE) positioning in E-UTRAN".
[4] 3GPP TS 36.355: "Evolved Universal Terrestrial Radio Access (E-UTRA); LTE Positioning Protocol (LPP)"
[5] 3GPP TS 23.271: "Functional stage 2 description of Location Services (LCS)".
[6] OMA Secure User Plane Location (SUPL)
[7] EP17199204

The invention claimed is:

1. A terminal device for use in a wireless telecommunications network, the terminal device comprising:

wireless communications receiver circuitry configured to receive signals from the infrastructure equipment via a wireless access interface provided by the infrastructure equipment, position detection receiver circuitry configured to receive a radio signal from one or more position detection signal emitting devices from which radio signal measurements can be made to assist in determining a position of the terminal device, and controller circuitry configured to control the wireless communications receiver circuitry to detect position assistance information transmitted from the infrastructure equipment which can be used to estimate in combination with the measurement of the radio signal, received from the one or more position detection signal emitting devices, the position of the terminal device, wherein the position assistance information comprises a sequence of data items which are received sequentially, and each of the data items of the sequence includes a counter number corresponding to a sequential number of an order of data units that were transmitted from the infrastructure equipment to the UE, wherein the controller circuitry is configured with the receiver circuitry to detect a failure in communicating the position assistance information based on the counter number of the received data items not being a sequential order, and in response to detecting the failure in communicating the position assistance information to perform a position assistance information failure procedure.

2. The terminal device as claimed in claim 1, wherein the position assistance information failure procedure includes adapting one or more communications parameters in order to recover the position assistance information received from the infrastructure equipment.

3. The terminal device according to claim 2, comprising transmitter circuitry configured to transmit signals via the wireless access interface to the infrastructure equipment of the wireless communications network, wherein the controller circuitry is configured in combination with the transmitter circuitry to transmit a message to the wireless communications network indicating that there has been a failure in communicating the position assistance information as part of the position assistance information recovery procedure.

4. The terminal device according to claim 3, wherein the controller circuitry is configured with the transmitter circuitry to transmit the message indicating that there has been a failure in communicating the position assistance information by transmitting a preamble as part of a random access procedure, the preamble being known to the wireless communications network to represent an indication that there has been a failure in communicating the position assistance information.

5. The terminal device according to claim 3, wherein the message is transmitted when the terminal device is in an idle mode in which the device is not configured to transmit signals to the wireless communications network.

6. The terminal device according to claim 2, wherein the controller circuitry is configured with the transmitter circuitry to transmit a message indicating that there has been a failure in communicating the position assistance information, when the terminal device is in a connected mode in which the transmitter circuitry is configured to transmit signals representing data to the wireless communications network, the message being transmitted to a location server via the wireless communications network to indicate that the terminal device cannot decrypt the position assistance information and in response to receiving updated encryption parameters from the location server.

7. The terminal device according to claim 1, comprising transmitter circuitry configured to transmit signals via the wireless access interface to the infrastructure equipment of the wireless communications network, wherein the controller circuitry is configured in combination with the transmitter circuitry to perform the position assistance information failure procedure when in an idle mode in which the transmitter is configured not to transmit data to the infrastructure equipment to trigger a radio resource control connection establishment procedure in which one or more adapted communications parameters are received.

8. The terminal device according to claim 1, wherein the controller circuitry is configured with the receiver circuitry to receive the position assistance information as the radio resource control layer encoded packet data unit, to decode the encoded packet data unit in accordance with a radio resource control, RRC, layer and to decrypt one or more of the encrypted position assistance information as a packet data convergence protocol, PDCP, layer, and the position assistance information failure procedure includes the PDCP layer informing the RRC layer of the failure in communicating the position assistance information.

9. The terminal device according to claim 1, wherein the controller circuitry is configured to form a packet data convergence protocol layer and to receive the position assistance information at the packet data convergence protocol layer as one or more packet data units, the packet data units being the data items of the position assistance information and each of the packet data units including the counter number corresponding to a sequential number of the order in which the packet data units were transmitted from a packet data convergence layer entity formed within the wireless communications network which transmitted the packet data units.

10. A terminal device for use in a wireless telecommunications network, the terminal device comprising:
wireless communications receiver circuitry configured to receive signals from the infrastructure equipment via a wireless access interface provided by the infrastructure equipment,
position detection receiver circuitry configured to receive a radio signal from one or more position detection signal emitting devices from which radio signal measurements can be made to assist in determining a position of the terminal device, and
controller circuitry configured to
control the wireless communications receiver circuitry to detect position assistance information transmitted from the infrastructure equipment which can be used to estimate in combination with the measurement of the radio signal, received from the one or more position detection signal emitting devices, the position of the terminal device, the position assistance information having been encrypted and encoded for integrity protection, wherein the controller circuitry is configured with the receiver circuitry in response to detecting a failure in the encryption or the integrity protection to perform a position assistance information failure procedure,
wherein the position assistance information failure procedure comprises a Packet Data Convergence Protocol (PDCP) entity in the terminal device performing an integrity check and deciphering of received encrypted system information and informing a radio resource control (RRC) of an LTE Position Protocol-RRC (LPP-RRC) entity about the integrity and deciphering failure.

11. The terminal device as claimed in claim 10, wherein the position assistance information failure procedure comprises when the terminal device is in an idle mode triggering an RRC Connection establishment procedure.

12. The terminal device as claimed in claim 10, wherein the position assistance information failure procedure comprises the terminal device informing the wireless communications network using either in MSG3 or MSG 5 or RRC reconfiguration message.

13. The terminal device as claimed in claim 10, wherein the position assistance information failure procedure comprises the terminal device performing a random access procedure to inform the network of a failure of the position assistance information.

14. The terminal device as claimed in claim 10, wherein the position assistance information failure procedure comprises the terminal device changing from an INACTIVE mode to an RRC_Connected mode.

15. The terminal device as claimed in claim 1, wherein the position assistance information failure procedure comprises when the terminal device is in the Connected mode and receiving position assistance information via system information blocks, performing an RRC re-establishment procedure indicating a failure in the communication of the position assistance information.

16. The terminal device as claimed in claim 10, wherein the position assistance information failure procedure comprises if the terminal device is in a Connected mode and detects the failure of communicating the position assistance information, informing a location server SMLC about integrity failure in order to receive updated parameters.

17. The terminal device as claimed in claim 10, wherein the position assistance information failure procedure comprises the terminal device logging the failure in communicating the position assistance information as part of SON/MDT measurements.

18. The terminal device as claimed in claim 10, wherein the position assistance information failure procedure comprises connecting to the wireless communications nets network to receive updated information so that deciphering and integrity check is performed successfully.

19. A method by a terminal device of generating an estimate of a position of the terminal device, the method comprising
- receiving a radio signal from one or more position detection signal emitting devices from which one or more radio signal measurements can be made to assist in determining a position of the terminal device, and
- detecting position assistance information transmitted from an infrastructure equipment of the wireless communications network which can be used in estimating, in combination with the one or more radio signal measurements of the radio signal received from the one or more position detection signal emitting devices, the position of terminal device,
- wherein the position assistance information comprises a sequence of data items which are received sequentially, and each of the data items of the sequence includes a counter number corresponding to a sequential number of an order of data units that were transmitted from the infrastructure equipment to the UE,
- wherein the detecting position assistance information includes
- detecting a failure in communicating the position assistance information based on the counter number of the received data items not being a sequential order, and
- in response to detecting the failure in communicating the position assistance information performing a position assistance information failure procedure.

* * * * *